United States Patent [19]
Medendorp

[11] Patent Number: 4,702,507
[45] Date of Patent: Oct. 27, 1987

[54] LOCKING DEVICE FOR MULTIPLE PIVOTABLE MEMBERS

[76] Inventor: Richard L. Medendorp, P.O. Box 1951, Sandpoint, Id. 83864

[21] Appl. No.: 901,416

[22] Filed: Aug. 28, 1986

[51] Int. Cl.[4] ........................ A01M 23/24; B66C 1/10
[52] U.S. Cl. ........................................ 294/66.1; 43/96; 114/305
[58] Field of Search ............... 294/66.1; 114/304, 305; 43/96

[56] References Cited

U.S. PATENT DOCUMENTS

| | | | |
|---|---|---|---|
| 1,031,903 | 7/1912 | Anderson | 294/66.1 |
| 2,602,689 | 7/1952 | Matz | 294/66.1 |
| 2,887,980 | 5/1959 | Madden | 114/305 |
| 3,092,412 | 6/1963 | Drake | 294/66.1 |
| 4,130,961 | 12/1978 | Snow | 43/96 |
| 4,145,835 | 3/1979 | Snow | 43/96 |

*Primary Examiner*—James B. Marbert
*Attorney, Agent, or Firm*—Wells, St. John & Roberts

[57] ABSTRACT

A locking device is described for use in selectively locking a plurality of pivotable members at selected operative positions about a central axis. The device includes means for mounting the members for pivotal motion about axes that may be substantially parallel and spaced outwardly from a central axis of a support. The device also mounts the members for axial motion along the axes between locking and unlocking positions. An axially displaceable spool is spring biased on the support to normally urge the members axially toward the locking position. In the locking positions, locking surfaces on the members mate with complimentary surfaces on the support to prevent pivotal motion of the members about the individual member axes. The spool is selectively movable on the support to lock itself and the members in this axial orientation. The spool is also selectively retractable to enable axial separation of the locking surfaces. The unlocked members are individually pivotable to folded, inoperative positions.

16 Claims, 9 Drawing Figures

LOCKING DEVICE FOR MULTIPLE PIVOTABLE MEMBERS

TECHNICAL FIELD

The present invention relates to selective angular and axial locking of a plurality of members carried on a support for individual pivotal and axial movement in relation to a central axis.

BACKGROUND OF THE INVENTION

A need has existed for an effective device by which a number of members, such as grapple hook tines, can be selectively locked in prescribed angular relationships about a central axis. A need has also existed in such devices for the capability of unlocking the individual members and pivoting them to a different angular relationship. In grapple hooks, for example, the need is to selectively, yet securely lock the grapple hook tines in operative, substantially radial orientations for use; then to facilitate unlocking of the hook tines for pivotal folding movement to closed, storage conditions. Similar needs exist in other apparatus where it is desirable to securely lock expandable frames in their outwardly expanded condition. The above needs are recognized, to a limited degree, in the following United States patents.

U.S. Pat. No. 4,145,835 to Snow discloses a spring operated folding grapple. The device disclosed includes a pair of pivoted members and an integral camming mechanism that imparts pivotal motion of the two members responsive to axial motion of one member between a flat storage condition and a expanded condition wherein the hook flukes are oriented perpendicular to one another. Movement of one of the members is dependent upon corresponding movement of the other. A locking pin is provided to hold the flukes in the expanded condition.

A somewhat similar structure is shown in U.S. Pat. No. 4,130,961 also to Snow. In this device, flukes of the grapple hooks are welded together and arranged in such a manner that an axial pulling force on one hook pair will result in pivotal motion of that pair to an expanded, operable condition in relation to the remaining pair.

U.S. Pat. No. 2,602,869 to Matz discloses a collapsible hook structure having a sliding plate used for both expanding the several pivoted hooks of the device and for holding the hooks against individual pivotal movement while at the expanded position.

U.S. Pat. No. 3,092,412 to Drake discloses a grab hook having foldable hook tines. The tines are foldable from a relatively flat configuration overlying one another to an operative condition wherein the tines are substantially radial about a central axis. A threaded wedge nut is utilized to axially clamp against the hook flukes. Grooves within the wedge member receive portions of the flukes to hold them in the radial positions by a axial clamping action between the grooves and an outside sleeve.

U.S. Pat. No. 1,031,903 to Anderson discloses a gaf hook that includes foldable hook members. The individual hook members fold about axes that are situated in a plane substantially perpendicular to the central support for the hooks. The hooks fold individually through arcs of approximately 180° to an operative position wherein the pointed hook ends face outwardly. They also fold to an inoperative position in which the pointed hook ends face inwardly and the hook shanks extend in a direction opposite the direction of extension. A sliding collar is provided on the support to releasably hold the hooks in either operative or inoperative positions.

Of the above references, none disclose the positive locking arrangement as disclosed herein by which individual pivoted members may be quickly yet securely held in an operative position by means of mechanism that is relatively simple yet reliable and extremely easy to operate. This is a definite need, especially in areas where the associated device (such as a grapple hook) is to be used in a critical situation as, for example, when the apparatus is used as a grapple hook in climbing or descending.

BRIEF DESCRIPTION OF THE DRAWINGS

The preferred embodiment of the invention is illustrated in the accompanying drawings, in which.

DETAILED DESCRIPTION OF THE PREFERRED EMBODIMENT

Figure 1:
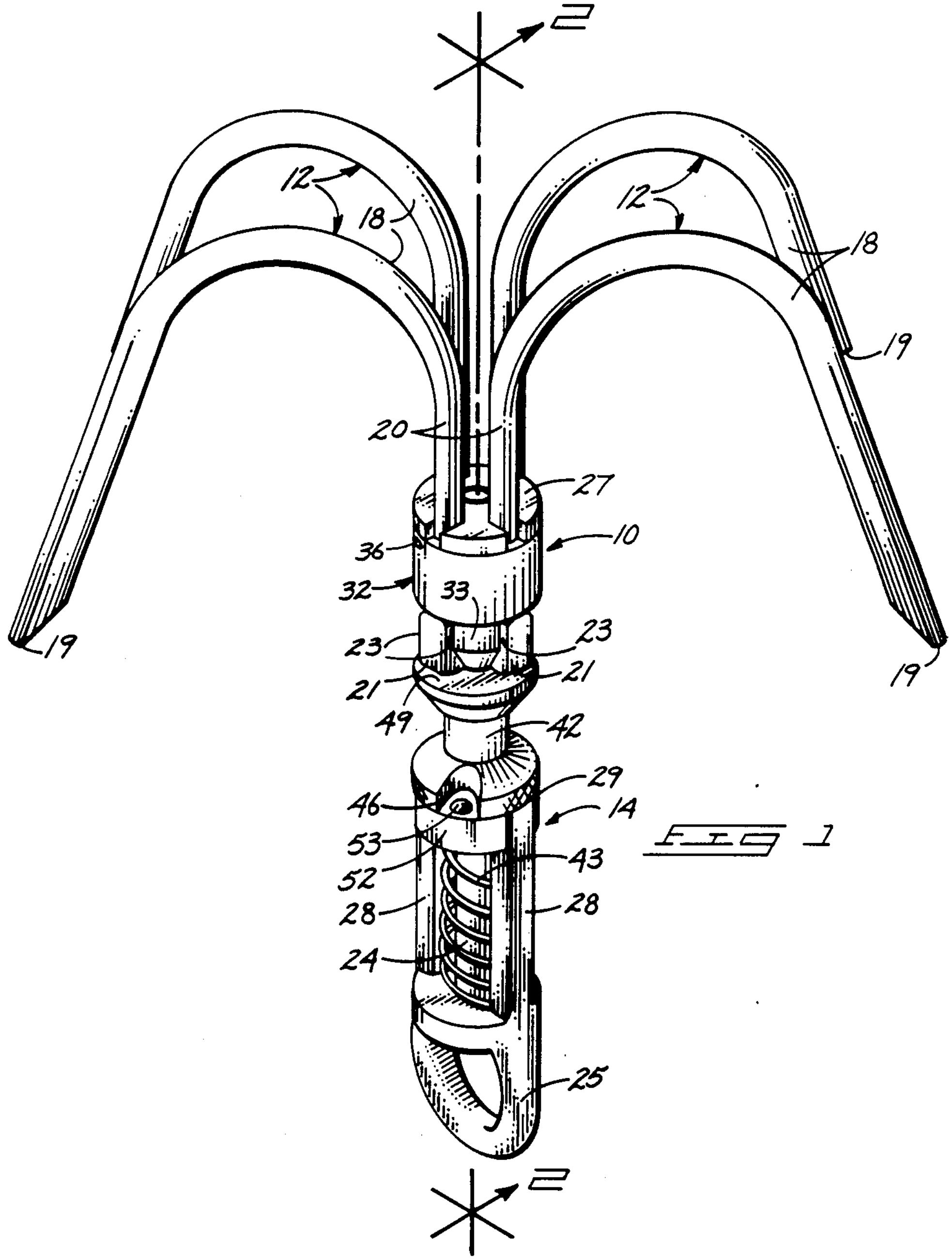
FIG. 1 is a pictorial view of the present device in association with a grapple hook.

In compliance with the constitutional purpose of the Patent Laws "to promote the progress of science and useful art" (Article 1, Section 8), applicant submits the following disclosure of the invention.

The present invention is embodied in a locking device generally indicated in the accompanying drawings by the reference numeral 10. The present locking device 10 may be used as an integral component of a structure such as the grapple hook shown in the present drawings. It should be understood, however, that the present locking device may be used with other apparatus including but not limited to, anchors, antennae, umbrella supports, tent supports, and other apparatus where it is desirable to selectively lock a number of pivoted members in selected positions.

In the example described below and shown in the drawings, the members selectively held in position by the present locking device are indicated at 12. By way of example, the members 12 are known as grapple hook tines 18. They are mounted to a support 14 for selective individual pivotal and axial movement in relation to individual pivot axes. The support 14 may also function as a handle for the grapple hook configuration.

Figure 2:
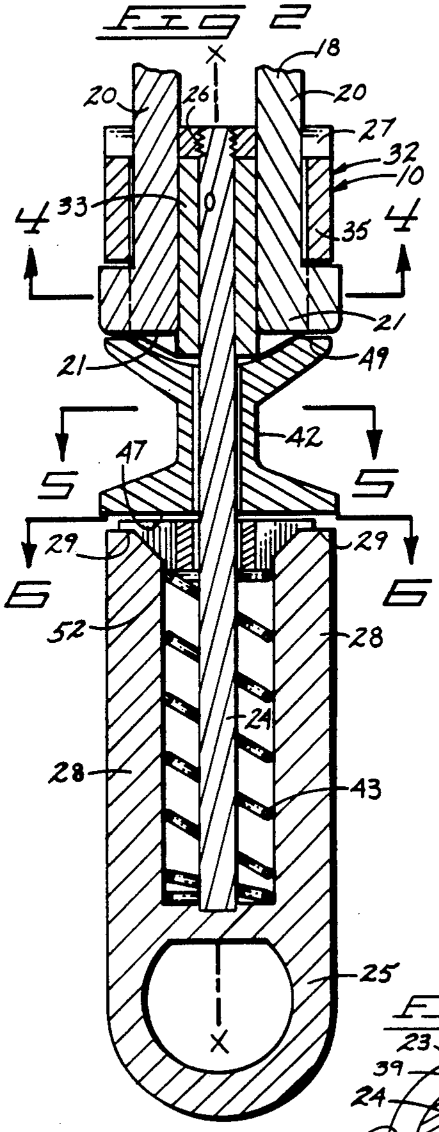
FIG. 2 is an enlarged sectional view taken substantially along line 2—2 in FIG. 1.

The pivot axis for each of the members 12 is situated along the support 14 and spaced from a central support axis x—x (FIG. 2). The individual pivot axes for the members may be substantially parallel to one another and to the central support axis.

Figure 7:
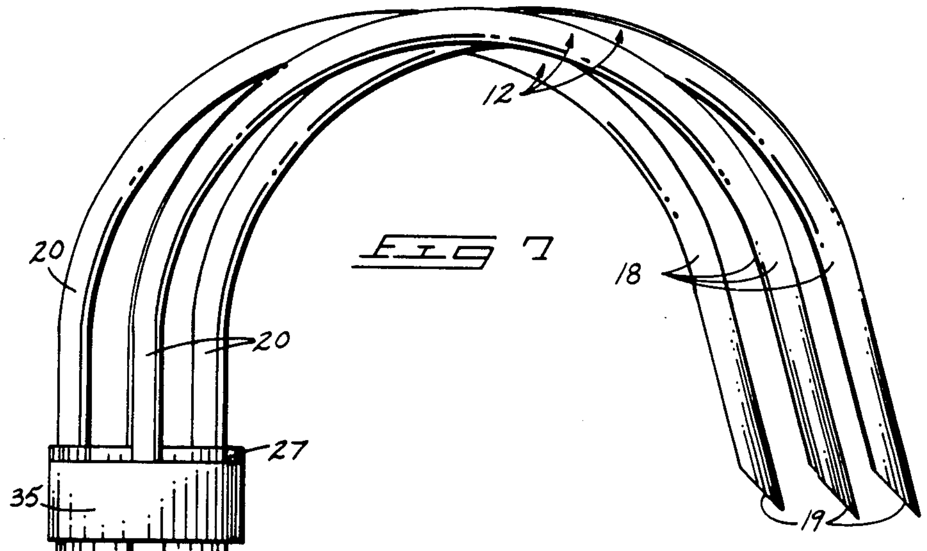
FIG. 7 is a elevation view showing the hook of FIG. 1 folded to a inoperative, storage condition.
Figure 7:
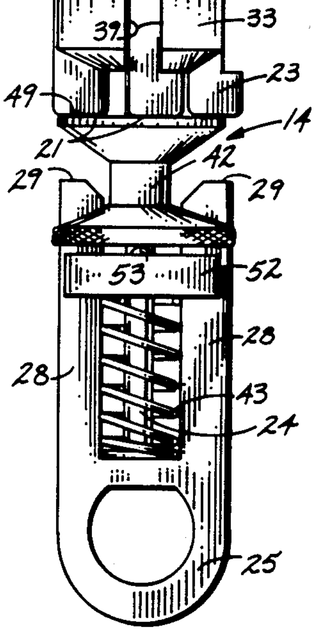

The members 12 are shown in FIGS. 1 and 7 pivoted between an inoperative angular storage condition (FIG. 7) wherein the members are folded into close proximity to one another and operative angular condition (FIG. 1) wherein the members may extend substantially radially from the support 14.

In the example shown, the grapple hook tines 18 include free pointed ends 19. The ends 19 are formed at outward extremities of hook shaped rods leading from the pointed ends 19 to substantially axial shanks 20. The shanks 20 are circular in cross section (FIG. 8) and terminate at base ends 21 (FIGS. 2–4,7). It is preferred that the members 12 (grapple hooks 18) include first locking surfaces 23. In the grapple hook configuration, the first locking surfaces 23 may be formed at or near the individual base ends 21. The first locking surfaces 23 may be comprised of outwardly projecting integral flanges along the shanks as shown in section in FIG. 4.

The support 14 may include an elongated central shaft 24 including an eyelet 25 at one end. An opposite end of the shaft 24 may include threads 26 for releasably receiving a cap nut 27. Parallel axial guides 28 may extend along the central shaft 24 from the eyelet 25 to abutment ends 29.

Figure 3:
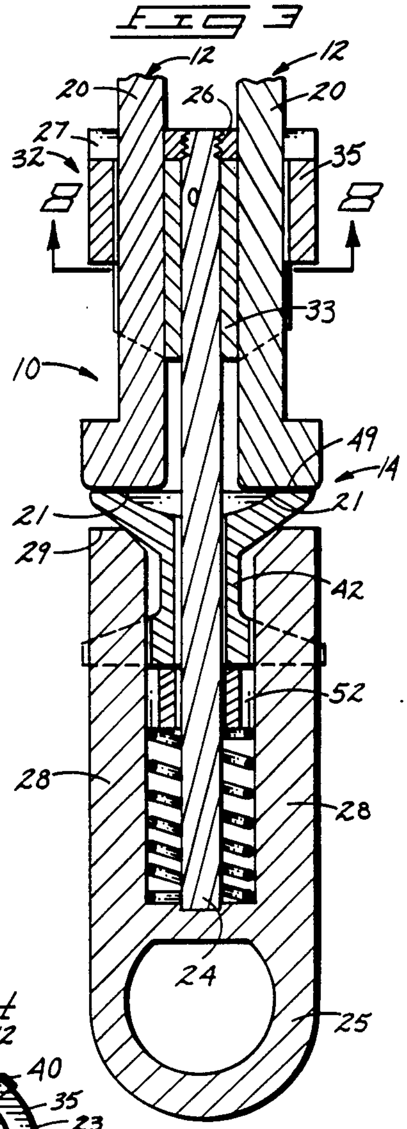
FIG. 3 is a view similar to FIG. 2 only showing a different operational position of the elements therein.

The support 14 may also include collar means 32, affixed to the central shaft 24 adjacent the threaded shaft end 26 under the cap 27 for mounting the members 12. The collar means 32 may include an inner axially slotted cylinder 33 secured to the shaft 24. The cylinder may be provided with open axial recesses 34 that are selectively covered by an outer keeper sleeve 35. The collar 32 and sleeve 35 receive the member shanks 20 for selective individual pivotal movement between the operative and inoperative angular condition and for axial movement between locking positions (FIGS. 1, 2, 4) and unlocking positions (FIG. 3).

Figure 9:
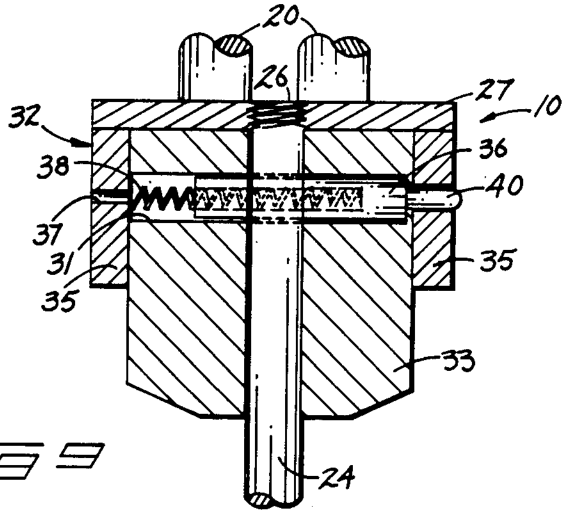
FIG. 9 is an enlarged sectional view taken substantially along line 9—9 in FIG. 8.

The cylinder core 33 has a passageway 31 for receiving pin 36 shown in the enlarged sectional view of FIG. 9.

The assembly pin 36 may extend radially through the cylinder 33 and shaft 24 to a shoulder close to the outside diameter of cylinder 33 but not going through cylinder 33. The pin 36 is hollow to receive a compression spring 38. The pin 36 has a reduced tip 40 that engages through sleeve 35. The shoulder butts up against a reduced end of passageway 31 to hold these components in precise stationary positions on the support. The pin 36 can be pushed inward to enable disassembly of the entire unit for cleaning and maintenance. The outer keeper sleeve 35 has a small aperture 37 for receiving oil or lubrication for the spring 38 and assembly pin 36 therein.

Second locking surfaces 39 are provided on support 14 to selectively interfit with the first surfaces 23. The mating surfaces 23, 39 when axially engaged (FIGS. 1, 2, 4) selectively lock the members in their operative positions. The second locking surfaces 39 may be formed integrally within the inner cylinder 33 as substantially parallel axial walls of the inner cylinder recesses 34. When engaged, the surfaces 39 and 23 prevent the members from pivoting freely about their individual axes.

The individual angular orientations of the locking surfaces 39 on the collar and the surfaces 23 on members 12 determines the locked operative angular orientation of the members.

Figure 4:
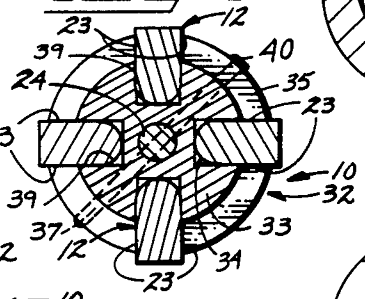
FIG. 4 is a sectional view taken substantially along line 4—4 of FIG. 2.
Figure 8:
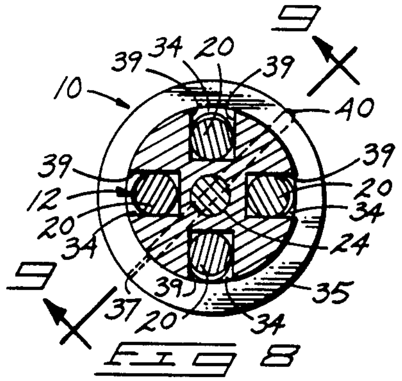
FIG. 8 is a sectional view taken substantially along line 8—8 in FIG. 3.

Pivotal motion of the members to the inoperative angular condition is permitted only when the members are moved axially to the unlocking positions shown in FIGS. 3 and 8. At this position the members are free to pivot about their pivot axes to and from the inoperative orientation shown in FIG. 7. The members 12 may also be angularly spread while in the unlocking axial positions and axially moved to the locking positions as shown in FIGS. 1, 2 and 4.

In the grapple hook embodiment shown, the first and second locking surfaces 23, 39 are arranged so the hooks can be secured positively against pivotal motion when in outwardly extending, substantially radial orientations with respect to the central axis of the support.

A spool 42 may be mounted to the central shaft 24 of support 14 for rotational movement thereon and for axial sliding movement along the shaft 24 between spool locking and unlocking positions (FIGS. 2 and 3 respectively). The axial length of the spool 42 between a top surface 49 and a bottom surface 47 is substantially equal to the axial distance between the guide abutment ends 29 and collar cylinder 33. The spool top end 49 engages the members 12 at their ends 21, to control axial movement of the members as a group between the locking and unlocking positions thereof. The spool bottom end 47 engages a biasing means in the form of a follower 52 and a compression spring 43 situated between the spool bottom end 47 and eyelet 25. It is preferred that the spring 43 be partially compressed at all times in the assembly to continuously urge the follower 52, spool 42 and the members 12 axially toward the locking positions.

A spool locking means may be provided for selectively locking the spool 42 against axial motion along the length of the support. The spool locking means is provided to lock the spool axially between guide abutment ends 29 and the member base ends 21 when in the upward locking positions. The spool locking means 45 may include the guide abutment ends 29 and a pair of slots 46 formed in the spool 42 for slidably receiving the axial guides 28.

As indicated above, the spool 42 is both slidable axially and rotatable angularly on the central shaft 24. The spool can be rotated to bring the slots 46 into and away from alignment with the guides 28. However, such pivotal motion is allowed only at the spool locking position, at a location along the length of the support where the slots 46 are beyond engagement with the guides 28. This position is shown in FIGS. 1 and 2 where a bottom surface 47 of the spool has been axially positioned upwardly from the guide abutment ends 29. The spool is therefore free from engagement with the guides and is capable of being rotated on the central shaft 24. In this position the opposite top surface 49 of the spool secures the members 12 in relation to the fixed collar 32 with the locking surfaces 23 and 38 securely engaged.

Figure 5:
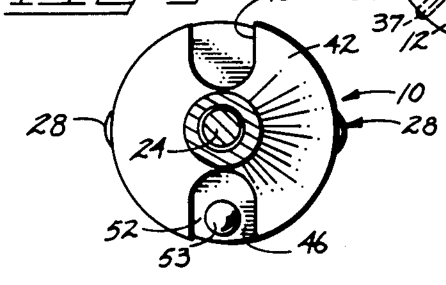
FIG. 5 is a sectional view taken substantially along line 5—5 of FIG. 2.
Figure 6:
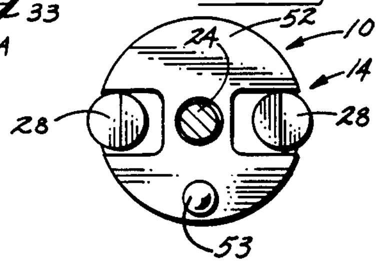
FIG. 6 is a sectional view taken substantially along line 6—6 of FIG. 2.

Means is also provided for releasably locking the spool against rotation on shaft 24 from the position shown by FIGS. 1 and 2 and 5. Such means is provided in the form of an axially spring biased detent pin or button 53 (FIGS. 1, 5 and 6) that may be similar to the pin 37 shown in FIG. 9. The detent 53 is axially mounted to the follower 52.

The follower 52 is slidably mounted to the shaft 24 between the compression spring 43 and the bottom surface 47 of the spool. The follower includes opposed slots for slidably receiving the guides 28. The follower is therefore free to move axially along the support but will not rotate.

The detent bottom 53 is situated on follower 52 to be releasably received within either of the spool slots 46 as shown in FIGS. 1 and 5. The detent button is smoothly rounded at its upward end so it can be depressed to slide beneath the spool as the spool is rotated, then snap upwardly into position as one of the spool slots 42 rotates into the position shown in FIGS. 1 and 5. The button then extends axially outward beyond the bottom surface 47 of the spool and between the walls of the slot 46, thus preventing rotation of the spool to bring the slots back into alignment with the guides 28. The spool can be released for rotation only if the detent button 53 is depressed below the bottom surface 47 as the spool is rotated to align the slots 46 with the axial guides 28.

It is noted that the axial dimension of spool 42 between end surfaces 47, 49 is such that the bottom surface 47 will rest against the abutment ends 29 in the locking position. At the same time, the opposite, upper spool surface 49 holds the first locking surfaces of the members securely in axial engagement with the complimentary second locking surfaces of the collar means. The members 12 are therefore axially locked between the top surface of the spool and the stationary bottom edge of the rigid keeper sleeve 35. Also, in this position the members are not allowed to pivot independently about their axes due to engagement of the locking surfaces 23 and 39. The members are therefore selectively, yet securely, locked in the operative positions and cannot be unintentionally pivoted or moved axially in relation to the support.

To unlock the present device, the user must first axially depress the detent button 53 into the follower 52. While holding the detent in this position, the user then rotates the spool 42 to bring the associated slots 46 over the detent and into alignment with the axial guides 28. Once the slots 46 and axial guides 28 come into alignment, the spool becomes axially unlocked and can be retracted along the guides against resistance of the spring 43.

The position of the spool after movement of the spool axially along the guides and central shaft to an unlocking condition is shown in section in FIG. 3. The axially displaced spool will allow the members 12 to slide axially to disengage the locking surfaces 23 and 39. The members then become free to pivot about their individual axes as defined by the collar means 32.

The members 12 can be pivoted independently toward one another and the spool can be released to slide back against the ends 21, clamping them to the collar as shown in FIG. 7 to hold the members in their selected inoperative positions. The members therefore present a compact configuration for storage and transport.

In order for the members to again be pivoted to their operative positions, the spool should be retracted axially so the members 12 can be pivoted freely to align the first locking surfaces 23 with the stationary second locking surfaces 39. The spool can then be released to urge the members and integral locking surfaces 23 axially to mate with the second locking surfaces 39. The spool 42 can then be locked in this position to secure the members axially. This is done by turning the spool 42 on shaft 24 to bring one or the other of the slots 46 into alignment with the detent button 53. The button will snap into the aligned slot 46, to abut the slot walls and prevent unintentional rotation of the spool to its unlocked position.

The above described device can be effectively utilized to positively lock the members 12 in their operative orientations. Positive, intentional action is required to unlock the members from their selected positions. This is a distinct advantage, especially in applications where the members 12 must remain in their operative positions for safety purposes.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A locking device, comprising:
- a support having a central axis;
- a plurality of members mounted to the support for individual pivotal movement about pivot axes spaced angularly about the central axis between operative and inoperative angular conditions and for selective axial movement in relation to the support along the central axis between locking and unlocking positions;
- each of the members including a first locking surface thereon;
- second locking surfaces positioned on the support for engagement with the first locking surfaces of the individual members at the locking positions thereof the selectively lock the members against individual pivotal movement from the operative angular conditions thereof; and
- means for selectively locking the members axially with the first and second locking surfaces engaged.

2. The locking device of claim 1 wherein the pivot axes of the plurality of members are substantially parallel to the central axis.

3. The locking device of claim 2 wherein the pivot axes of the plurality of members are substantially parallel to one another.

4. The locking device of claim 1 wherein the plurality of members project outwardly of their individual pivot axes and substantially overlie one another in the inoperative angular condition and project substantially radially of the central axis in the operative angular condition.

5. The locking device of claim 1 wherein the means for selectively locking the members axially with the first and second locking surfaces engaged is comprised of:
- a spool axially slidable on the support and engaging the plurality of members; and
- spring means between the spool and support for yieldably urging the spool against the members to urge the members axially toward the locking positions thereof.

6. The locking device of claim 5 wherein the means for selectively locking the members axially is further comprised of spool locking means between the spool and support for selectively locking the spool axially against the members at the operative positions thereof.

7. The locking device of claim 6 wherein the spool locking means is comprised of:

at least one axial guide on the support extending axially thereon to an end having an abutment surface thereon;

wherein the spool is rotatable about the central axis on the support and includes an axial opening formed therein for slidably receiving the axial guide; and wherein the abutment surface on the axial guide is positioned along the support to lock the spool axially against the members at the locking positions thereof and to facilitate selective rotation of the spool to bring the axial opening into alignment with the guide to slidably receive the guide and thereby enable the spool to slide axially along the guide.

8. The locking device of claim 1 wherein the members are grapple hook tines.

9. The locking device of claim 8 wherein the support is formed as a handle for the grapple hook tines and includes an eyelet opening at an end thereof.

10. A foldable grapple hook comprisng:

a support including a longitudinal central axis;

a plurality of hook members, mounted to the support, each having a point at a free end and an axial shank section leading to a base end;

a first locking surface along the axial shank section of each hook member;

collar means mounting the hook members along the axial shank sections thereof for angular pivotal motion about hook axes spaced about the central axis between operative and inoperative angular positions and for selective axial movement along the hook axes between locking and unlocking positions;

second locking surfaces positioned on the collar means engagement with the first locking surfaces at the axial locking positions thereof to selectively lock the hook members against individual pivotal movement about the hook axes from the operative angular positions; and means for selectively locking the hook members axially at the locking positions thereof and with the first and second locking surfaces engaged.

11. The foldable grapple hook of claim 10 wherein the second locking surfaces are formed within the collar means as receptacles for axially receiving the first locking surfaces; and wherein the means for selectively locking the hook members axially includes:

a spool means mounted to the support member and selectively axially movable along the support member to (a) the locking position, for axially locking the members with the first locking surfaces thereof axially received in the receptacles, and to (b) the unlocking position wherein the first and second locking surfaces are axially disengaged and the hook members are allowed to pivot individually to the inoperative positions.

12. The foldable grapple hook of claim 11 further comprising biasing means for urging the spool means to engage and move the hooks axially toward the locking positions.

13. The foldable grapple hook of claim 11 wherein the means for selectively locking the hook members axially is comprised of means for selectively axially locking the spool means to lock the hooks axially in the locking positions.

14. The foldable grapple hook of claim 13 wherein the spool means is rotatable on the support means and wherein the means for axially locking the spool means is comprised of:

an axial guide on the support having an abutment end adjacent the spool means at the locking position thereof; and a slot formed in the spool means, rotatable with the spool means at the locking position thereof into and out of alignment with the guide such that the spool means may be axially locked at the locking position when the slot is rotated out of alignment with the guide and unlocked, allowing axial movement of the spool means along the guide to unlock the first and second locking surfaces when the slot is rotated into alignment with the guide.

15. A locking device, comprising:

a support having a central axis;

a plurality of members mounted to the support for individual pivotal movement about pivot axes spaced angularly about the central axis between operative and inoperative angular conditions and for selective axial movement along the support in relation to the central axis between locking and unlocking positions;

each of the members including a first locking surface thereon;

second locking surfaces positioned on the support for selective engagement with the first locking surfaces of the individual members at the locking positions thereof to selectively lock the members against individual pivotal movement from the operative angular conditions thereof;

a spool axially slidable on the support and engaging the plurality of members;

spring means between the spool and support for yieldably urging the spool against the members to urge the members axially toward the locking positions thereof;

an abutment surface on the support;

wherein the spool includes an opening formed therein rotatable about the central axis into axial alignment with the abutment surface for axially slidably receiving the abutment surface; and wherein the abutment surface is positioned along the support for selectively locking the spool axially against the members at the locking positions thereof, and to facilitate selective rotation of the spool opening into alignment with the abutment surface to axially receive the abutment surface and thereby enable the spool to slide axially along the guide.

16. A foldable grapple hook, comprising:

a support having a central axis;

a plurality of hook members mounted to the support for individual pivotal movement about hook pivot axes spaced angularly about the central axis between operative and inoperative angular conditions and for selective axial movememt along the support in relation to the central axis between locking and unlocking positions;

each of the hook members including a first locking surface thereon;

second locking surfaces positioned on the support for selective engagement with the first locking surfaces of the individual hook members at the locking positions thereof to selectively lock the hook members against individual pivotal movement from the operative angular conditions thereof;

a spool axially slidable on the support and engaging the plurality of hook members;

spring means between the spool and support for yieldably urging the spool against the hook members to urge the hook members axially toward the locking positions thereof;

an abutment surface on the support;

wherein the spool includes an opening formed therein rotatable about the central axis into axial alignment with the abutment surface to axially slidably receive the abutment surface; and wherein the abutment surface is positioned along the support for abutment with the spool to selectively lock the spool axially against the hook members at the locking positions thereof, and to facilitate selective rotation of the spool opening into alignment with the abutment surface to axially receive the abutment surface and thereby enable the spool to slide axially along the guide and thereby release the hook members from the operative conditions and allow pivotal movement thereof to the inoperative conditions.

* * * * *